US007058197B1

(12) United States Patent
McGuire et al.

(10) Patent No.: US 7,058,197 B1
(45) Date of Patent: Jun. 6, 2006

(54) MULTI-VARIABLE MODEL FOR IDENTIFYING CROP RESPONSE ZONES IN A FIELD

(75) Inventors: John Dennis McGuire, Byron, MI (US); Randall Scott Pearson, Edwardsville, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/434,391

(22) Filed: Nov. 4, 1999

(51) Int. Cl.
*G06K 9/00* (2006.01)
(52) U.S. Cl. ...................... 382/100; 382/108
(58) Field of Classification Search ............... 382/100, 382/103, 106, 108, 109, 110, 181, 191, 206, 382/218, 224, 286, 227, 228, 113; 348/141, 348/144; 358/524; 702/3, 13
See application file for complete search history.

(56) References Cited

U.S. PATENT DOCUMENTS

| | | | | |
|---|---|---|---|---|
| 2,916,212 | A | 12/1959 | Mita | 703/3 |
| 2,980,330 | A | 4/1961 | Ablow et al. | 705/7 |
| 3,027,083 | A | 3/1962 | Heigl et al. | 703/3 |
| 3,136,887 | A | 6/1964 | Heigl et al. | 703/3 |
| 3,978,324 | A | 8/1976 | Rayner | 705/28 |
| 4,015,366 | A | 4/1977 | Hall, III | 47/143 |
| 4,227,211 | A | 10/1980 | Disbrow | 348/164 |
| 4,276,561 | A * | 6/1981 | Friedman | 358/524 |
| 4,315,282 | A * | 2/1982 | Schumacher | 348/141 |
| 4,642,766 | A | 2/1987 | Funk et al. | 705/7 |
| 4,851,999 | A | 7/1989 | Moriyama | 705/30 |
| 4,908,763 | A * | 3/1990 | Sundberg | 702/13 |
| 4,918,602 | A | 4/1990 | Bone et al. | 705/1 |
| 5,166,789 | A * | 11/1992 | Myrick | 348/144 |
| 5,233,513 | A | 8/1993 | Doyle | 705/7 |
| 5,299,115 | A | 3/1994 | Fields et al. | 705/10 |
| 5,323,317 | A * | 6/1994 | Hampton et al. | 702/3 |

(Continued)

FOREIGN PATENT DOCUMENTS

WO   PCT/US00/41510   11/1999

(Continued)

OTHER PUBLICATIONS

*Using Advanced Very High Resolution Radiometer Imagery to Map Rice Cropping Areas in Central Texas*, Eleni J. Paliouras and William J. Emery, 1999 IEEE, pp. 744-746.

(Continued)

*Primary Examiner*—Yon J. Couso
(74) *Attorney, Agent, or Firm*—Thompson Coburn LLP

(57) ABSTRACT

An computer implemented apparatus and method are disclosed for defining areas of a field in which a crop or other vegetation is grown based on their selective ability to grow such vegetation through a growing season, or some shorter preselected time period. The method includes making a number of temporally separated measurements through air borne imaging of a field, registering the data to the geography of the field and each other, normalizing the data including converting the data to a vegetative index indicative to the presence of vegetation in the field, comparing the data to identify clusters of like value, and classifying the clusters and images to learn how the different field areas responded in growing vegetation through the season. With this method, the field may be segregated into a number of like areas called crop response zones which exhibit similar vegetative growth characteristics as an aid to a grower in his decision making regarding how to maximize yield in his field.

69 Claims, 13 Drawing Sheets

U.S. PATENT DOCUMENTS

| | | | |
|---|---|---|---|
| 5,406,477 A | 4/1995 | Harhen | 703/6 |
| 5,414,847 A | 5/1995 | Tsukakoshi | 717/104 |
| 5,444,819 A | 8/1995 | Negishi | 706/21 |
| 5,459,656 A | 10/1995 | Fields et al. | 705/7 |
| 5,521,813 A | 5/1996 | Fox et al. | 705/8 |
| 5,521,814 A | 5/1996 | Teran et al. | 700/266 |
| 5,627,973 A | 5/1997 | Armstrong et al. | 705/10 |
| 5,630,127 A | 5/1997 | Moore et al. | 709/221 |
| 5,631,970 A * | 5/1997 | Hsu | 382/113 |
| 5,646,846 A | 7/1997 | Bruce et al. | 701/50 |
| 5,659,623 A | 8/1997 | Conrad | 382/110 |
| 5,668,719 A | 9/1997 | Bobrov et al. | 702/2 |
| 5,689,418 A | 11/1997 | Monson | 702/2 |
| 5,712,985 A | 1/1998 | Lee et al. | 705/7 |
| 5,715,185 A | 2/1998 | Carter | 705/7 |
| 5,719,949 A * | 2/1998 | Koeln et al. | 382/113 |
| 5,727,161 A | 3/1998 | Purcell, Jr. | 705/7 |
| 5,734,837 A | 3/1998 | Flores et al. | 705/7 |
| 5,745,878 A | 4/1998 | Hashimoto et al. | 705/1 |
| 5,764,819 A * | 6/1998 | Orr et al. | 382/110 |
| 5,765,137 A | 6/1998 | Lee | 705/7 |
| 5,768,128 A | 6/1998 | Thompson et al. | 702/2 |
| 5,790,428 A | 8/1998 | Easton et al. | 702/154 |
| 5,812,988 A | 9/1998 | Sandretto | 705/36 |
| 5,822,736 A | 10/1998 | Hartman et al. | 705/1 |
| 5,832,456 A | 11/1998 | Fox et al. | 705/10 |
| 5,862,512 A | 1/1999 | Voorhees et al. | 702/2 |
| 5,867,820 A | 2/1999 | Cureton et al. | 705/1 |
| 5,873,049 A | 2/1999 | Bielak et al. | 702/6 |
| 5,878,356 A * | 3/1999 | Garrot et al. | 701/1 |
| 5,884,224 A | 3/1999 | McNabb et al. | 702/2 |
| 5,886,662 A * | 3/1999 | Johnson | 342/25 |
| 5,897,619 A | 4/1999 | Hargrove, Jr. et al. | 705/4 |
| 5,901,237 A | 5/1999 | Conrad | 382/10 |
| 6,366,681 B1 * | 4/2002 | Hutchins | 382/110 |

FOREIGN PATENT DOCUMENTS

| | | |
|---|---|---|
| WO | WO00/08590 | 2/2000 |

OTHER PUBLICATIONS

*A Model-Based System For Crop Classification From Radar Imagery*, J.A. Conway, L.M.J. Brown, N.J. Veck and R.A. Cordey, GEC Journal of Research, vol. 9, No. 1, 1991, pp. 46-54.

*Pattern Classification and Scene Analysis*, R.O. Duda and P.E. Hart, 1973, pp. 24-31.

* cited by examiner

Electromagnetic Spectrum

Remote Sensing Model $$I_r = A_r + R_r + T_r$$

Pixel Concept

Oblique Arial Photography with Simulated Pixel Grid

Digital Reflectance Values and Their Relation to Imagery

Spatial Resolution

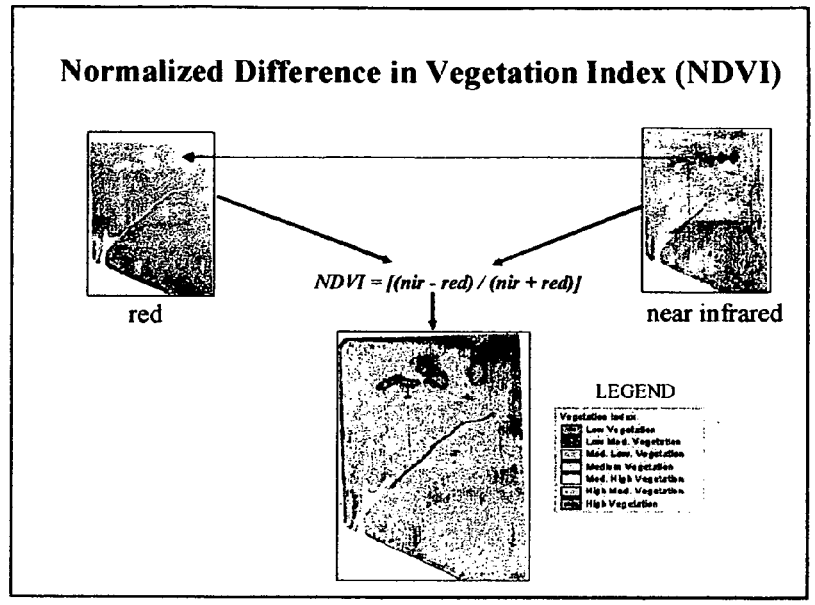
FIGURE 10
$$\text{Normalized Value} = \frac{(\text{Pixel Value} - \text{Field Mean})}{\text{Field Standard Deviation}}$$
FIGURE 11
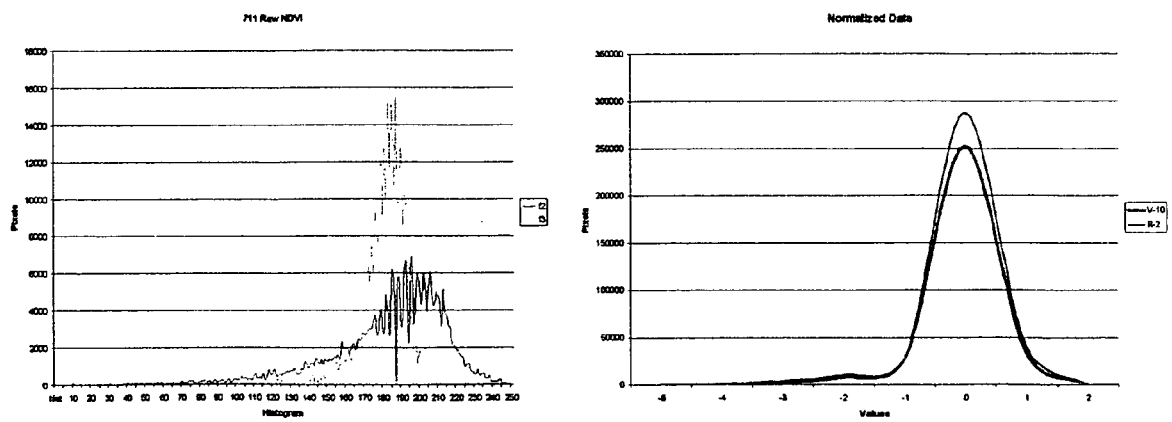
FIGURE 12

MULTI-VARIABLE MODEL FOR IDENTIFYING CROP RESPONSE ZONES IN A FIELD

BACKGROUND AND SUMMARY OF THE INVENTION

Remote sensing is the science of acquiring information about the earth's land and water resources without coming into physical contact with the feature to be studied. One of three basic outcomes can effect light (electromagnetic energy) as it passes through the earth's atmosphere and strikes an object; it can be absorbed, reflected or transmitted. In general, remote sensing measures that part of the electromagnetic spectrum that is either reflected or emitted (thermal energy) from an object. As an object (green plant) grows, generally, the leaf area of the plant increases, and the different portions of the electromagnetic spectrum respond accordingly (i.e., red reflectance decreases and near-infrared reflectance increases).

There are different methods of data collection from remote sensing systems; a single band (panchromatic), several bands (multi spectral) or hundreds of bands (hyperspectral). These images of reflectance can be useful at a specific wavelength or waveband, but are often more useful when combined with images at other wavelengths (i.e., multispectral or hyperspectral). Multiple wavelength reflectance data allows for the creation of field maps that illustrate ratios of selected wavelengths. These mathematical ratios of wavebands (a type of vegetation indices) have statistically significant relationships with vegetative conditions with an area, and when collected strategically over time are useful in visualizing crop growth and development change over the course of a growing season (temporal resolution).

Changes in reflectance values over time can be attributed to differences in plant growth and development or plant health. This assumes that environmental conditions that may effect the reflectance of light have remained the same over time. However, we know that it is unlikely that the sun will be at the exact same angle, that cloud patterns are the same, that particulate matter in the atmosphere will be constant or the position of the sensor over the object will be unchanged from one date of image capture to the next. These factors introduce variation between data sets not attributable to the growing crop, thus making it virtually impossible to accumulate data over a growing season (growing season is considered from the end of harvest through the next harvest) that can be compared to identify changes in the crop alone. While there have been various prior art attempts to eliminate these kinds of unwanted variation, (i.e., using laser light sources at night instead of the sun as a light source, schemes for adjusting the variation in photographic film, and others) the inventors are not aware of successful methodology that has been developed for taking the data as collected and then satisfactorily adjusting the data itself for comparison over time (i.e., through a growing season). As reliable data comparisons have not been made in the prior art, there are few reliable conclusions that can be drawn for a grower to help him in making the few decisions that are within his power to decide.

To solve these and other problems in the prior art, the inventors herein have succeeded in developing a methodology for normalizing data taken at different times over a growing season which eliminates the effect of the changing environmental and other conditions on the data so that the data is truly representative of the changing, growing crop in the field. This methodology can be applied to data in any form, but the inventors have chosen to apply it to visible and infrared reflectance data that have been converted to a form of vegetative index, such as the Normalized Difference Vegetative Index (NDVI). There are advantages to converting reflectance data to an NDVI, as is explained in greater detail below. Once converted, the data is then normalized using a statistical analysis over each data set independently of the other data. This is done by subtracting the mean value from each pixel value and then dividing the result by the standard deviation. By normalizing each data set, the extraneous variations introduced into the data is removed and the data may then be compared to gain insight about the crop and field. The power of this normalization should not be underestimated. It allows for the first time, as known to the inventors, agricultural data taken at different times and necessarily under different environmental conditions to be compared and to be combined as a tool for further analysis. This powerfully eliminates the effects of varying influences by factoring them out of the data while the prior art has either rather ineffectively sought to control the conditions under which the data were collected or to control the environmental conditions subject to control and ignore all others.

Still another aspect to the present invention is the temporal comparison of this normalized data which provides for the first time information that a grower may find useful in his decision making process. The inventors have found that the data is useful to define different segments of the field that perform similarly for growing crop and to create a story which characterizes the history of a growing season as it unfolds in these differently defined segments of the field. These "stories" for different parts of a field can be quite unique and yet produce very similar crop yield. Taking yield alone, a grower would see no difference between these different field areas, and previously would have been led to believe that he should make the same decisions for them, and as a result not achieve any improvement in yield. For example, one area might experience an early decline in vegetation, perhaps caused by too much moisture which depresses its final yield. Another area may be dry which also depresses its final yield. Yet the yield value alone would not distinguish between them. With the present invention, it is finally possible to create these "stories" or "histories" for the individually defined "pixels" of an entire field, and then to associate these pixels with field areas that share the same story, which enables the field to be divided into "like story" areas, or crop response zones as the inventors have defined the term. These crop response zones are areas of a field that have similar vegetative values at the time intervals in which the data is taken. So, for example, one such crop response zone might have low vegetation at the first and second intervals, mid level vegetation at the third interval, and high level vegetation at the last interval or end of the growing season. Another crop response zones might have high level vegetation at all intervals. Still other crop response zones would have other patterns of vegetation.

Crop response zones represent segments of the field where the crop grew similarly over time in response to certain static (soil texture, organic matter, elevation, slope) and dynamic variables (precipitation, solar radiation, air temperature). Thus, an understanding of the relationships between static and dynamic variables and resultant crop response will enable the grower to prescribe and apply certain combinations of controllable inputs such as seed, tillage, fertilizers and pesticides uniquely for specific field segments. For example, a grower will be able to identify those fields or segments of fields which respond positively to a certain hybrid/variety of seed. The inventors have utilized mathematical analysis to more rigorously define these crop response zones and that more rigorous analysis is explained below. However, an important part of the invention is that a grower can now define segments of his field that share common characteristics for which specifically tailored decisions may be made to optimize the yield across the entire field. Previously, growers were not provided with any scientifically valid way to define these field segments, even though many growers were able to adjust their decision making based on their great skill and experience over many years with their own fields. While the innate good "feel" that a grower commonly uses may result in some yield improvement, the present invention will now, for the first time, provide some validation to the grower that specific field areas exhibit certain characteristics that require different decisions in order to maximize their yield.

While some of the advantages and features of the present invention have been described above, a greater understanding of the invention may be attained by referring to the drawings and detailed description of the preferred embodiment which follows.

BRIEF DESCRIPTION OF THE DRAWINGS

FIG. 10 is a graphical illustration of a vegetative index known as NDVI, FIG. 11 is the formula for normalizing raw data, FIG. 12 is a pair of graphs illustrating the comparison of two data sets both before and after normalization.

DETAILED DESCRIPTION OF THE PREFERRED EMBODIMENT

Figure 1:
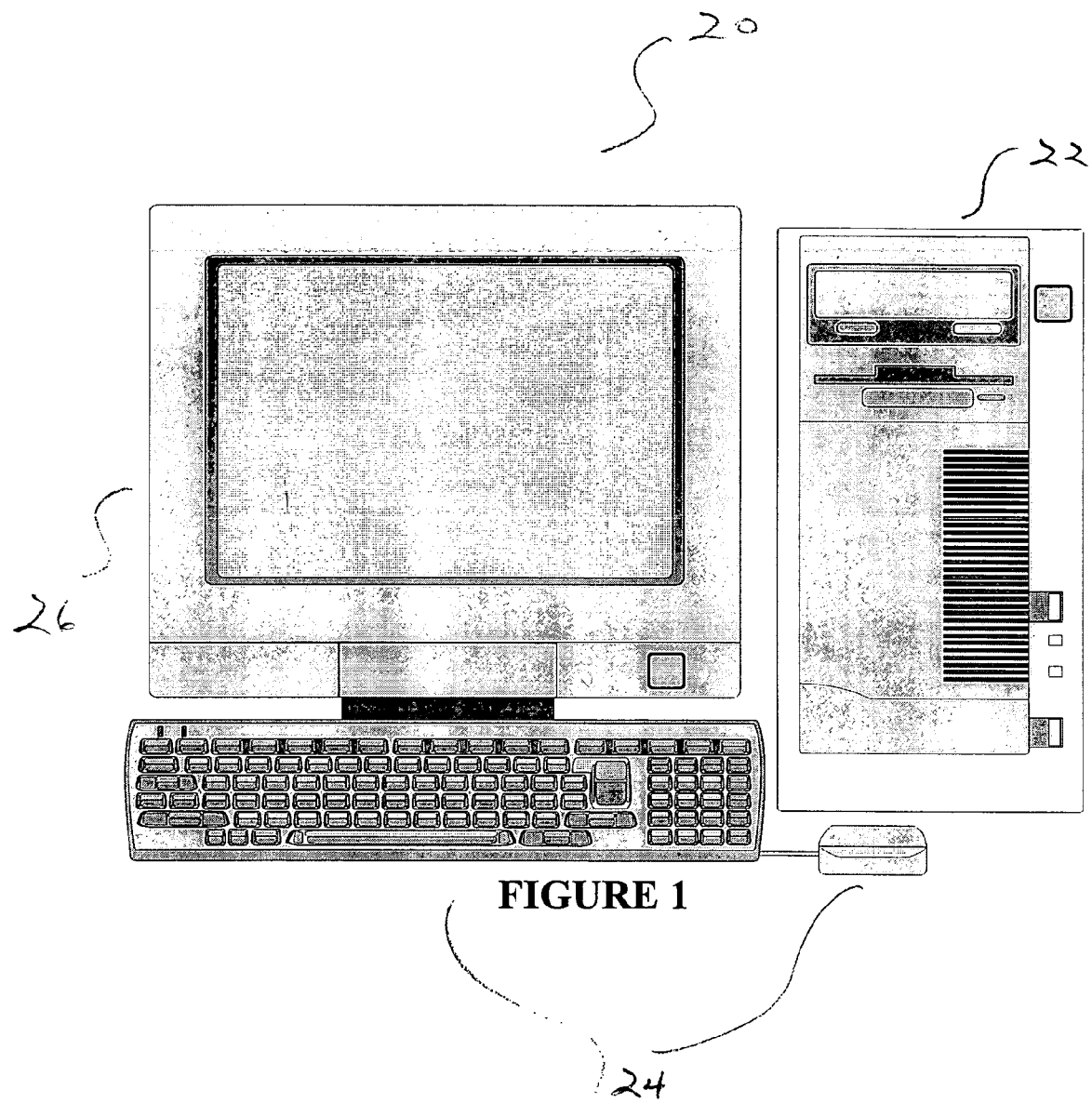
FIG. 1 is a graphical representation of a computer system for operating the method of the present invention.

The present invention takes advantage of the remote sensing of visible and infrared radiation reflected from crops in order to generate the initial raw data. This raw data is then converted to a vegetation index value. The converted data is then aggregated, clustered, and classified into crop response zones. The process and methodology of creating crop response zones may by readily achieved by processing data on a personal computer, preferably a more powerful pc such as a workstation. As shown in FIG. 1, a personal computer 20 has a processor 22, a variety of input devices 24 such as a keyboard, mouse, etc. as is well known in the art, and a display 26 which preferably is a larger size such as 22' computer monitor capable of producing color images. The majority of the computer programs used in the present invention are commercially available, except for the normalization step which is performed by the particular software program mentioned and included in this disclosure. This process will now be explained in greater detail.

Overview of Remote Sensing in Agriculture

Remote sensing is the collection of data from a distance; that is, without physical contact between the sensor and the object being measured. Although there are many types of remotely sensed data, the one most commonly associated with the term remote sensing is simple photography collected from aircraft or satellites. In fact, since the collection of the first aerial photograph in 1840, views from airborne and space borne platforms have become quite commonplace. Today, the value of this "view from above" is obvious when one only considers our reliance on weather satellites and space-based military surveillance.

This "view from above" has also played a major role in agriculture over the last fifty years with the collection of aerial photography, in support of soil surveys. However, with the recent advancements in sensor technology, the concept of remote sensing in agriculture has grown to include: hand-held devices which measure how plants reflect certain portions of the light spectrum, hand-held devices that measure temperature, multiple sensors mounted on farm implements and sprinkler systems, and airborne and space-borne digital collection systems that measure wavelengths of light way beyond the abilities of human vision. All of these systems are based on the fact that if a plant is growing differently from the surrounding plants, those differences can somehow be measured. This ability to measure the response of plants to wavelengths of light beyond human vision, coupled with its non-invasive nature has put remote sensing in the forefront of agricultural research.

Remote Sensing: Energy Matter Interactions

Figure 2:
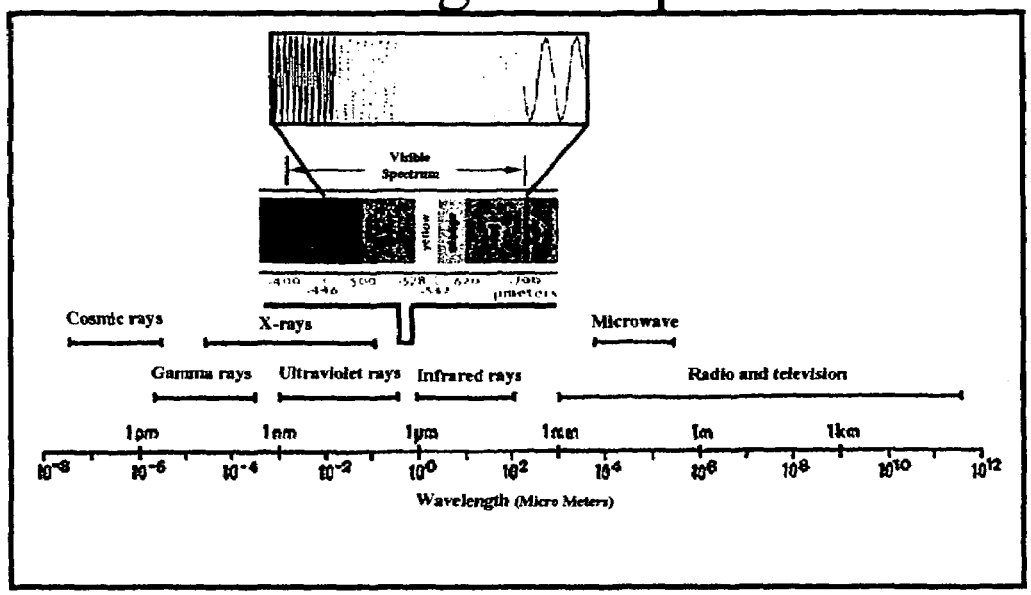
FIG. 2 is a graphical representation of the electromagnetic spectrum.

There are basically two types of remotely sensed systems available for land cover evaluation; active systems and passive systems. Active systems (i.e., radar, sonar, laser and seismic) send out their own energy and look for some sort of energy response. The amount of energy reflected back to the sensor gives the scientist insight into the type of object being measured. Passive systems on the other hand, do not provide their own source of energy and rely solely other sources of object illumination (i.e., typical reflective based cameras/scanners and thermal imaging systems). The primary source of energy for most passive systems is the sun, which emits energy in all possible wavelengths called the electromagnetic spectrum (FIG. 2). The following discussion relates only to passive systems using the sun as their source of energy. However, it should be understood by those of ordinary skill in the art that the initial raw data could be obtained by any method known in the prior art, including both passive and active.

Basic Remote Sensing Model

Figure 3:
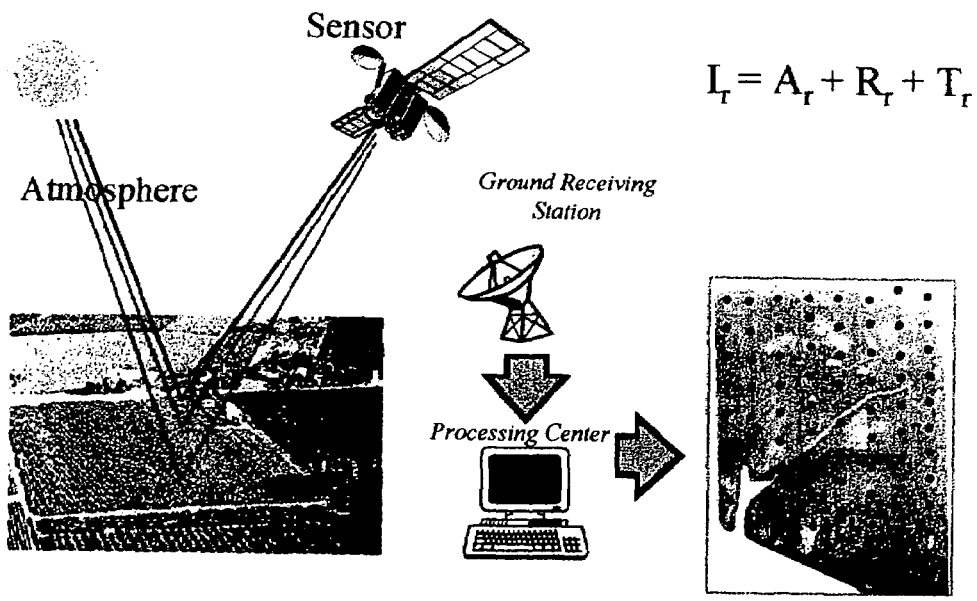
FIG. 3 is a graphical representation of a typical remote sensing model.
Figure 4:
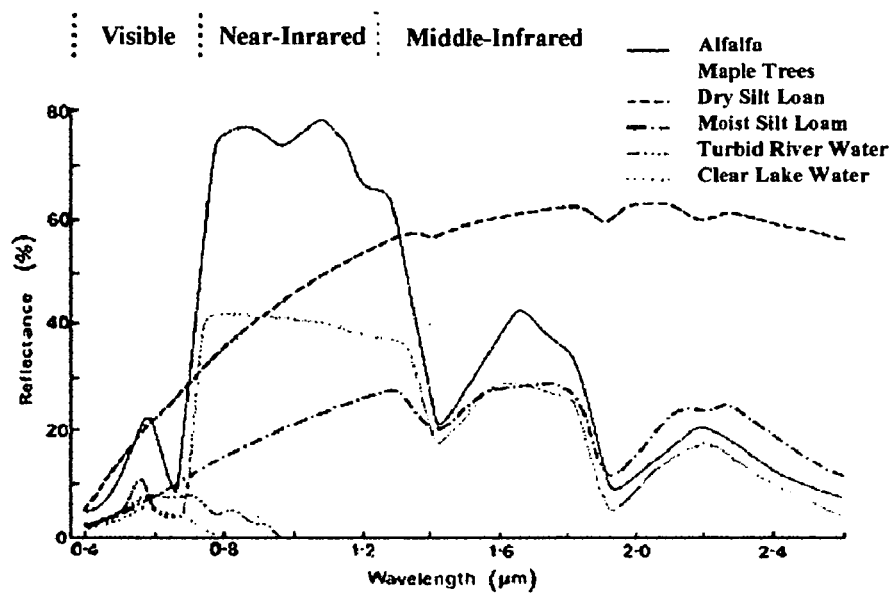
FIG. 4 is a graph depicting the reflected electromagnetic energy sensed by a remote sensing model from various crops and naturally occurring surfaces.

As sunlight ($I_r$) travels through space and strikes the earth (plants, soil, etc.), it undergoes one of three processes. The different wavelengths of light coming from the sun are either absorbed by the object ($A_r$), reflected off of the object ($R_r$), or transmitted through the object ($T_r$) (FIG. 3). Each object on earth reacts to these incoming wavelengths of light (termed the electromagnetic spectrum) in its own unique way resulting in a spectral curve. FIG. 4 gives the spectral curves for a variety of land cover types. Simply put, these curves indicate the amount of energy that is reflected from each object in the different portions of the electromagnetic spectrum.

In practice, the electromagnetic spectrum is divided into three basic sections (FIG. 4). These subdivisions include the visible, the near infrared, and the middle infrared portions of the spectrum. Each is described in detail below.

Figure 5:
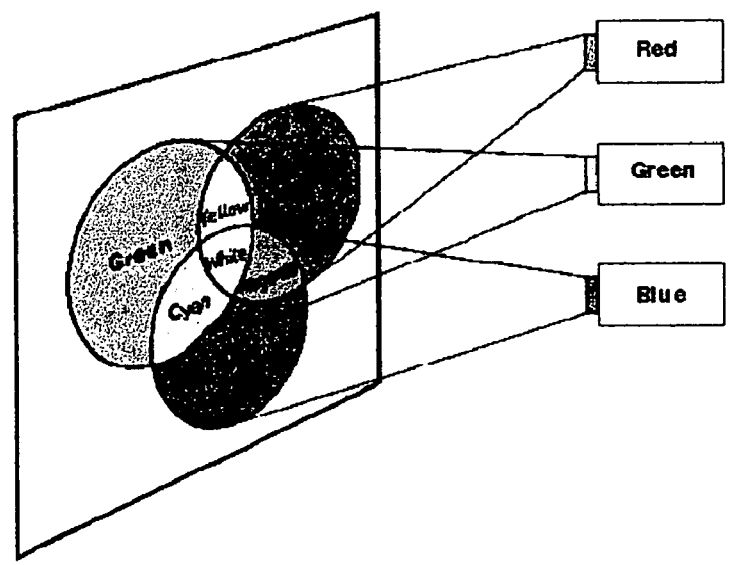
FIG. 5 is a graphical representation of the additive properties of colored light.

The first subdivision deals with that portion of the light spectrum where humans can see (400 nanometers to approximately 700 nanometers). It is in this part of the spectrum where pigment dominates. For instance, a blue car appears blue to the human eye because the car is absorbing green and red wavelengths of light while at the same time reflecting the blue portion of the light spectrum. A green object, on the other hand would absorb red and blue, while reflecting green light. Based on the additive properties of light (FIG. 5), an object that appears yellow to the human eye would be absorbing blue light while reflecting red and green light. A white object reflects all light and so is composed of all wavelengths of light, whereas, a black object is absorbing all wavelengths of light, thereby reflecting no energy at all.

Based on this simple concept described above, one can begin to understand how objects on earth obtain their visual appearance. A green plant is green, for example, because the chlorophyll (pigment) absorbs both blue and red light, while not readily absorbing green light. The healthier the plant, the more the chlorophyll production resulting in absorption of both the blue and red wavelengths. As a green plant begins to undergo stress (or simply senesces), the chlorophyll production slows, resulting in (at first) an increase in red reflectance, giving the plant a yellow appearance (remember red and green light mixed make yellow). Bare soil on the other hand, obtains its color through a combination of minerals, moisture, and organic matter, each of which affect the visible portion of the spectrum in different ways. For the most part, a soil curve in the visible portion of the electromagnetic spectrum has a flat to slight increase in reflectance with increasing wavelength. As well, the lower the overall spectral reflectance, the darker the soil; the higher the overall reflectance, the lighter the color of the soil.

The second major division of the electromagnetic spectrum ranges from about 700 nanometers to approximately 1500 nanometers and is called the near infrared. This portion of the light spectrum responds to the amount and health of plant cellular structure. In other words, objects like a soybean plant or maple tree will have high reflectance in the near infrared because they have large quantities of cellular structure that are oriented perpendicular to the incoming rays of light. Conversely, objects such as pine trees and less healthy vegetation will have lower reflectance of near infrared radiation while non-vegetated objects will have an even lower reflectance. Environmental objects with the lowest reflectance of all in the near infrared portion of the spectrum tends to be wet bare soil and water.

The third major division of the electromagnetic spectrum ranges from around 1500 nanometers to approximately 3000 nanometers and is referred to as the middle-infrared. It is this portion of the electromagnetic spectrum where moisture plays a dominant role. Although other factors such as organic matter, iron content, and clay content have an effect, moisture appears be the primary mechanism affecting reflectance. More specifically, the higher the moisture content, the lower the reflectance. As objects lose moisture or begin to dry, their reflectance in this portion of the electromagnetic spectrum increases. While this concept has been proven in a laboratory setting, applying this concept in practice has been somewhat evasive.

Temporal Variations in Spectral Curves

While it is true that many objects have a spectral curve that is static, many more objects have a spectral curve that is dynamic over time. Certainly, an agricultural field begins with variations of bare soil (light to dark) which have unique spectral curves. Over time, the soil is worked (changing the soil color) and vegetation begins to emerge. As vegetation begins to fill the field, there is a lowering of the red reflectance (due to increased chlorophyll) and an increase in near infrared reflectance (due to increased cellular structure). As the crop begins to mature, the field no longer has a bare soil curve; instead it has taken on the spectral curve of healthy green vegetation. As individual plants undergo stress there is within field variability of the spectral curve indicating variable amounts of chlorophyll production and a corresponding variable health of individual plant cells. Eventually the field begins to senesce and the chlorophyll begins to break down along with the vegetative cellular structure. This results in an increase in red reflectance and a decrease in near infrared reflectance (actually moving back toward the spectral curve of bare soil). As the crop is harvested and the bare soil in exposed, the spectral curve resets itself to that of bare soil.

This dynamic nature of spectral curves is not unique to agricultural crops. In fact, almost all things in nature have some sort of dynamic spectral curve based on the season. However, from an agricultural perspective, it is the dynamic nature of spectral curves that can be used to help determine the health (or potential stress) of vegetated areas during the season. The present invention is broad enough to be used with virtually any growing vegetation although it finds particular application for a grower of an agricultural crop.

Resolutions in Remote Sensing

Remote Sensing Systems

When one discusses remotely sensed systems, the issue of resolution inevitably arises. However, few people seem to understand that there are three basic types of resolution with regard to any given imaging system. These three resolutions include spectral, spatial, and temporal. While each plays a significant role in agricultural remote sensing, they are very different from each other. Each is discussed below.

Spectral Resolution

Figure 8:
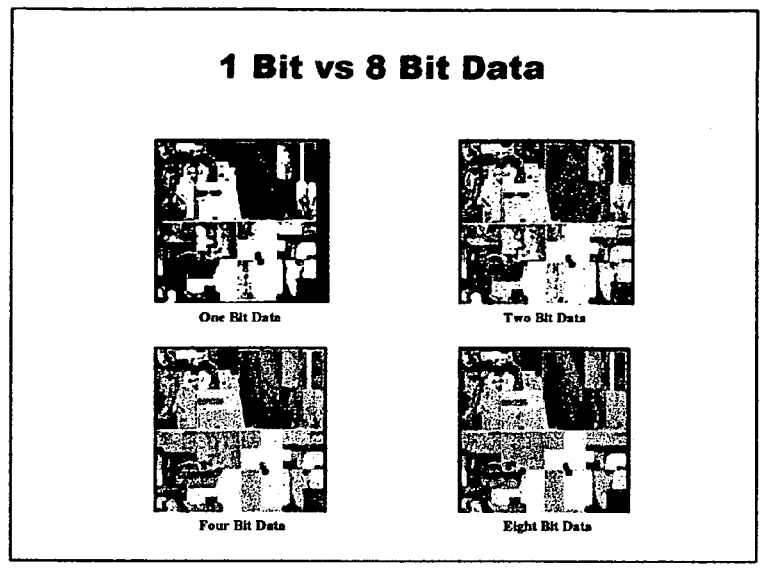
FIG. 8 is a pictorial representation of a series of images illustrating the effects of quantization level.

The spectral resolution of imaging systems simply indicates how many portions of the electromagnetic spectrum are being measured at a given time. This number of bands can range from only one band (termed panchromatic) to several hundred (hyperspectral). Typically, most imaging systems used in agriculture collect between 2 and 20 spectral bands (termed multispectral). Equally important to the number of bands, is the band-widths and the exact positioning of the bands along the spectrum. Historically, multispectral imaging systems have collected reflectance data using bandwidths of between 0.05 and 0.2 micrometers (50 to 200 nanometers). These bands are typically bandpass in nature and rarely overlap each other, resulting in unique measurements of specific portions of the electromagnetic spectrum. The band placement of historical imaging systems generally relates to specific portions of the spectrum where soil, water, or vegetation is behaving in a unique way. These positions include the following:

0.4–0.45 µm—water turbidity and chlorophyll production in green plants 0.5–0.55 µm—peak of the green portion of the spectrum to measure plant health 0.6–0.65 µm—the trough of a green vegetative curve indicating amount of pigment 0.8–1.10 µm—estimate of cell structure and also indicates moisture content 2.3–2.50 µm—measurement of soil moisture, organic matter, and clay content 10.0–12.0 µm—thermal emittance indicating temperature of an object Coupled closely with spectral resolution is the concept of quantization. Most current imaging systems have 8-bit detectors, which allow digital numbers (DN's) between 0 and 255 to be used. The better utilized the digital range is, the higher the potential for differentiating between spectrally different objects (FIG. 8). Each band of panchromatic, multispectral, or hyperspectral data is arranged so that the lower the reflectance, the lower the number. The digital numbers themselves, however, are only relative to each other and cannot be compared from one day to the next or from one image to the next. In order to be transformed into percent reflectance (for comparison with other images), one must account for atmospheric interference, time of day, sensor calibration, and a variety of other factors most of which are typically beyond the control of the data collector.

Spatial Resolution

Figure 6:
FIG. 6 is a graphical representation of the pixel concept as it relates to digital numbers.
Figure 6:
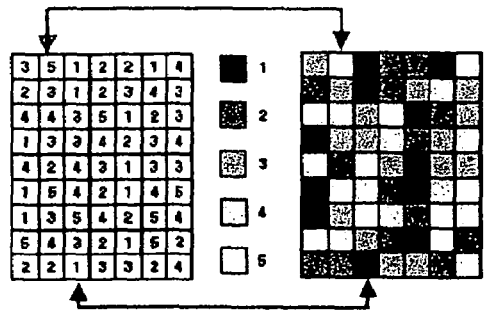
Figure 7:
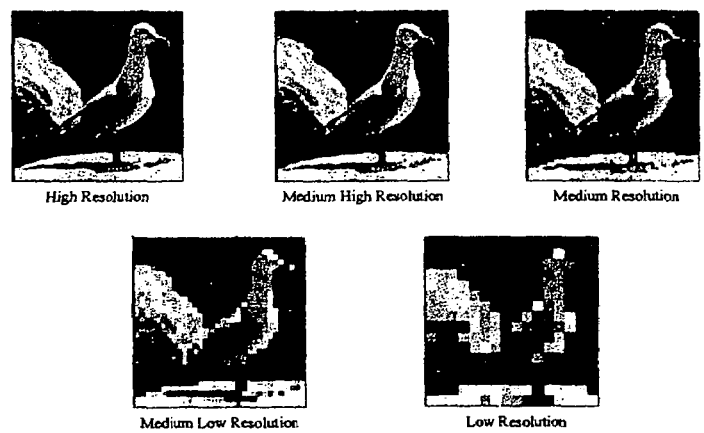
FIG. 7 is a pictorial representation of a series of images illustrating the effects of differing spatial resolution.

Most current airborne imaging systems are comprised of charged coupled device arrays (CCD arrays). These arrays are basically a grid of sensors, each of which collects or measures how much energy is being reflected off of the target in a particular wavelength (discussed above). Each individual grid is referred to as a pixel (FIG. 6). The area on the ground that a pixel correlates with (pixel size) is determined by the sensor's optics and the altitude of the imaging system. Typically, the larger the pixel size the blockier the image (FIG. 7). The spatial resolution for most airborne imaging systems ranges between ½ meter and several meters. The spatial resolution for imaging systems mounted on space borne satellites varies between 5 meters and several kilometers, depending on the application.

Historically, the spatial resolution of airborne digital cameras has been limited by the size of the sensor array and the above ground height of the measurements. Additionally, until recently, the technology has been too expensive to provide the required spatial resolution (combined with adequate areal extent) for most applications in agriculture. Recent advancements, however, in sensor technology are enabling more cost effective data collection, higher quality data, and more rapid information turn-around to the end users.

More recently, spatial data are being collected with GPS sensors in the form of point data, line data, and polygon data. Although theoretically a point and line cannot have area, these data types as collected in an agricultural setting often imply an area of interest. Therefore, all vector types (points, lines, and polygons) can be ultimately considered to be or related to pixels.

Temporal Resolution

Temporal resolution is an underused term in remote sensing that relates to the exact time of year, time of season, or time of day that an image needs to be acquired over an area of interest. Coupled with the exact timing of image acquisition is the total number of images required to adequately characterize the area of interest. This type of resolution is probably the most misunderstood and under researched area of remote sensing. What is the proper time for remotely sensed acquisition of a corn crop to help estimate yield, nitrogen stress, plant stand, etc? One could ask the same question of soybeans, cotton, citrus, alfalfa, potatoes, and many other crops. The answer is that few researchers seem to understand the importance of the questions above, much less the answers. This may perhaps be due to the failure of the prior art to provide the necessary technology to fully adjust for the temporal differences in the data collected. Without this technology, there is no reason to think about when to collect data because the data can't be correlated or used in combination due to the interferences introduced by the changes in environmental and other conditions which contaminate the data, at least without the benefit of the present invention.

Image Preprocessing

There are several steps involved in the preparation of air borne imagery prior to information extraction. These steps include band-to-band registration, vignetting correction, and geocorrection to a ground coordinate system, and are known in the prior art. Each of these steps is discussed below.

Band to Band Registration

When an airborne multispectral imaging system is flown, the cameras may be aligned in a row or set up in a two-dimensional array of their own. Nonetheless, the cameras are designed so that they image approximately the same area and are electronically triggered so that they image at virtually the same time. The result is a multi-band image in which each band is closely registered to the others. The problem is that with multispectral imagery, each pixel representing a given area on the ground in a particular waveband must be exactly registered with other pixels/bands measuring the same ground area. If the bands are not aligned, the image will take on a fuzzy appearance when viewed on a computer monitor and will provide misleading results when processed for information extraction.

One process of band-to-band registration requires manual location of similar points between two different bands. Once several points are located, an automated process is often employed that passes a moving kernel (computer based window) over the two images looking for areas of good spatial correlation. This automated method of point picking generally locates dozens to hundreds of points for an image with an array of approximately 1000 pixels by 1000 pixels. The system uses these points to calculate a mathematical transformation (using two-dimensional least squares, for example) to warp one band to the base image. The result is a multispectral image with all pixels representing a given area on the ground being aligned or stacked so that they now represent a spectral vector.

Vignetting

Most remote sensing systems that employ the use of a lens have a unique type of distortion called vignetting. Vignetting causes a darkening of the image as you move from the center toward the edge of the image. The darkening is a function of using the edge of the lens and is apparent in most aerial photography along the four corners. In digital imagery, it is often very difficult to visually identify vignetting, however, it can be identified through a variety of computer based methods. Both empirical and theoretical correction equations can be generated, however, the empirical method is most often employed. Most companies flying airborne imagery have the mathematical correction equations for their cameras. These correction equations are similar to a quadratic trend surface of the lens distortion. Vignetting correction simply removes the trend equation to adjust (add to or subtract from) the radial darkening produced by the imaging system's lens. This process is well known in the prior art.

Geocorrection

Most imaging systems flown on aircraft use Global Positioning Satellites (GPS) to know when the system is directly over the field of interest. However, small subtleties in aircraft attitude result in an image that is seldom oriented in a true north/south direction. As well, the imaging systems provide no location information for each pixel, thereby limiting the researcher's knowledge of its geographic position on the earth. This lack of geographic orientation can be corrected by locating known points on the earth (road intersections, center of a bush, corner of a house, etc.) and finding the corresponding pixels in the imagery. Once approximately ten to fifteen points are located, a transformation equation can be calculated (two-dimensional least squares, for example) and the image can be warped to overlay its correct geographic position (i.e., each pixel is positioned at its correct geographic coordinate). During this process, a map projection is chosen (i.e., state plane, UTM, etc.) to account for the flattening of the earth's curved surface. As well, a Datum is chosen (NAD27, NAD83, WGS84) that is used as the coordinate system's origin of reference. This process allows the remotely sensed data to be registered with other geographically oriented data such as field boundaries, yield data, and GPS measured soil samples.

Figure 9:
FIG. 9 is a pictorial representation of two images illustrating different methods of resampling.
Figure 9:
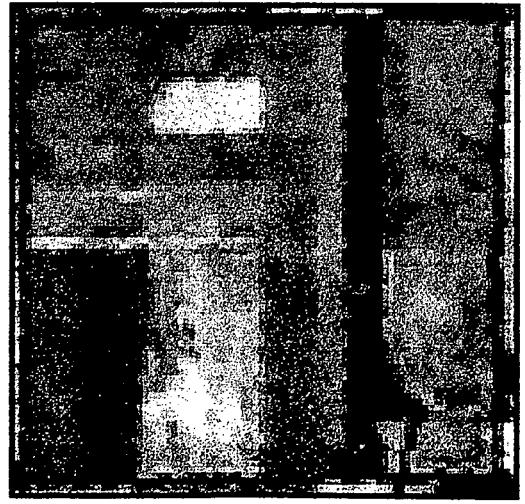

During the geocorrection process, several decisions have to be made. One very important decision is that of resampling. Do the newly created pixels simply reflect the old digital values, or should the newly created pixel be a weighted average of the pixels around it. The first method is termed nearest-neighbor while the second method may use bilinear-interpolation or cubic-convolution resampling, both of which are well known in the prior art. There are implications to using each method. Theoretically, nearest neighbor preserves the integrity of the original pixels while the other two methods can drastically change the data values (FIG. 9).

Another decision to be made is that of appropriate transformation polynomial. Typically, one wants to use the lowest order polynomial possible to eliminate poor extrapolation beyond the picked control points. However, at times the aircraft may be in a small bank resulting in data that indicates an apparent trapezoid shaped field when the field is actually a rectangle. Under this scenario, a higher order polynomial may be required or perhaps a rubber sheeting algorithm that performs a nonlinear stretch of the image. Again, these methodologies are well known in the prior art.

Image Enhancement

Image enhancement refers to the process of adjusting the image to enhance certain features within an image. For instance, a single band of imagery can measure light (energy) on a scale of 0–255 with digital numbers, but the human eye can only separate a few shades of a given color (less than 10). Often the colors in an image are adjusted so that the colors magnify the differences for the desired portions of an image. For example, in an agricultural image a field may have a brightness variation in a given band that ranges from 120 to 140, a farm road 80–82, and a barn roof 180–183. If no adjustments are made, the computer will segment the image into 12 equal categories from 80–183, which will only permit 2 colors to represent the variation in the field. But if we enhance the image, we can force the majority of the colors over the area of interest (i.e., so that 10 of the 12 colors in the range show field variation).

An entire image contains a wide range of brightness values. For instance, a road, a building, and an agricultural crop may range over 100 digital counts in the blue portion of the spectrum. However, within a single cornfield, the range of the digital numbers might be less than 10. Therefore, a grower that is more interested in looking at the crop in his field can have the image enhanced to adjust the color of the image to be on the scale of the differences within the field. This results in the ability to see more variability in the field and less variability for the road or roof tops (things that have less interest to the end user).

Vegetative Indices

While a given band of data (i.e., red or near infrared) may be very informative to a grower, the combination of two or more bands (in the form of a vegetative index) is often useful. Vegetative indices are often used for assessing the variability of vegetative health within a given field. The most common of these known in the prior art includes the NDVI (Normalized Difference Vegetative Index) which is calculated as follows:

$$NDVI=(nir-red)/(nir+red)$$

This NDVI particular ratio plays on the inverse relationship between the red and near infrared with regard to healthy green vegetation versus bare soil. As stated earlier in the "Temporal Variation of Spectral Curves" section, there is a temporal dynamic to various natural objects. An NDVI takes advantage of these temporal differences by measuring the deviations away from a soil spectral curve as an agricultural crop begins to grow. As a crop begins to emerge, there is more chlorophyll production, causing a decrease in red reflectance. As well, there is an increase in biomass or cell structure causing an increase in near infrared reflectance. This inverse relationship is captured in an NDVI resulting in a high value (near 1.0 for healthy green vegetation) and a very low number for stressed or unhealthy vegetation (near 0.0). One thing to note is that an NDVI is very sensitive to atmospheric and sensor variations (FIG. 10).

There are, however, a variety of so called vegetation indices, or data that characterize vegetative growth, that are not mathematically based or are simple calculations at best. These include (but are not limited to) the near infrared (by itself) or the near infrared minus the red. In fact, there are many types of data that can be considered as vegetation indices or vegetation health monitors. These include (but are not limited to) yield monitor derived data, EM-38 data, soil surveys, and organic matter maps.

Image Normalization

Historically, the cost and labor required to obtain radiometrically-corrected data has limited the feasibility of any process requiring the analysis of multi-temporal remotely sensed imagery. Radiometric correction, as discussed previously, is the method of accounting for specific sources of error in collected data. An important aspect of the crop response zone invention relies on vegetative indices calculated using multi-temporal imagery. Therefore a method of pseudo-calibration is important to realizing the invention. The methodology developed to supplement calibration of the remotely sensed data will be the focus of the next section.

The method of pseudo-calibration chosen by the inventors is a normalization technique, which can transform any type of data given its distribution about a given value. The technique only requires simple calculations to be performed after the field mean and field standard deviation have been determined (FIG. 11.) Using this formula every eight bit pixel value (0–255) is replaced by a positive (or negative) value corresponding to its position greater or less than the mean value. FIG. 12 shows two data sets before and after normalization. The figure shows that the data can be meaningfully compared on similar scales after the normalization formula has been implemented. Being able to compare data of similar scale allows the analyst the ability to assess the relative vegetative health through the growing season (growing season is considered from the end of harvest through the next harvest) by eliminating the undesirable effects of variations in the data introduced by environmental and other conditions. Additionally, similar scale is of the utmost importance in isodata clustering which is an important aspect of the crop response zone invention.

The historical limitation of radiometric correction to analysis of multi-temporal remotely sensed imagery has been overcome using a method of pseudo-calibration called normalization. This innovation provides an advantage that the crop response zone invention demonstrates over the prior art. The inventors are aware of some attempts in the prior art to provide a "standard" which could then be used to "normalize" the data. One such attempt involves the placing in the field of a set of placards, ranging from dark to light colored, whose image is collected at the same time that the image of the crop is collected. The theory is that the data representing the placard in each image would provide a gauge as to how the different conditions affected the data collected during each flight, and that the data could then be corrected to a common standard using some conversion factor calculated from the placard data. However, this was not found to be satisfactory.

Image Clustering and Classification

One of the most fascinating and powerful operations one can perform on multispectral imagery is that of grouping, i.e. clustering and classification. This process enables the researcher to identify natural groupings of spectral homogeneity. For instance, the average spectral signature (spectral curve) for a given land cover type (e.g., deciduous forest) can be calculated for a given data set. Once this statistic is calculated, each pixel in the image can be compared to this statistic to determine if it has any potential of being deciduous forest. The following gives an overview of how the clustering and classification process works.

Clustering

The first step in the classification process is to develop a set of mathematical statistics that represent each potential land cover in the study area. These statistics will be comprised of a mean and standard deviation (for each land cover class) for each band of the multispectral imagery. Although there are several basic methods of statistics generation, one primary method (the unsupervised approach) is used in areas where ground truth may be limiting.

Figure 13:
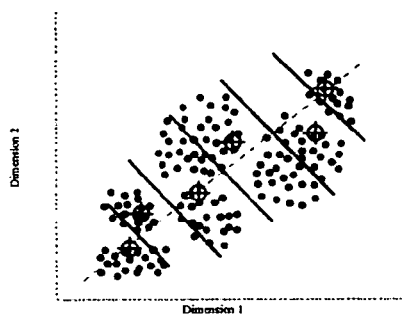
FIG. 13 is a graph depicting the initial step of segregating data into clusters.

The most popular method of developing a set of unsupervised statistics is the Iterative Self-Organizing Data Analysis Technique (ISODATA). The following is a listing of the steps involved in this iterative method of generating training statistics:

the software plots the data in multidimensional feature space (FIG. 13)

the first principal axis is drawn through the data arbitrary cluster boundaries are set within the system the mean value for each arbitrary cluster is determined (this is done for each band)

Figure 14:
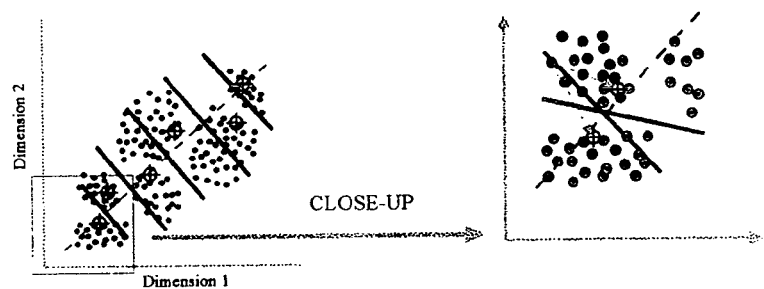
FIG. 14 is a graph depicting the iterative process of cluster delineation.
Figure 15:
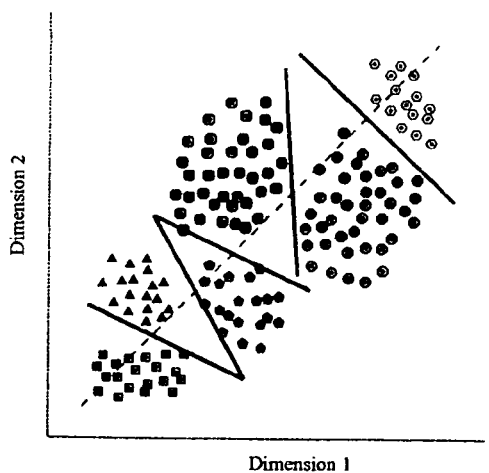
FIG. 15 is a graph depicting the final phase of segmenting the data into clusters.

THE EUCLIDEAN DISTANCE IS CALCULATED FOR EACH PIXEL AND THE CLUSTER CENTERS each pixel is regrouped into the cluster in which it had the smallest Euclidean distance a new mean is calculated for the new clusters (FIG. 14)

the process begins again the process continues until the cluster centroids are stabilized and less than 5% (generally user defined) of the pixels changes cluster classes (FIG. 15)

once the iterations stop, descriptive statistics (means and standard deviations) for each cluster is calculated the clusters are then evaluated as to what type of land cover they represent The inventors have found that in analyzing their experimental data that eight clusters was often the optimum number. It should also be noted that the clusters each have their own statistical identity, and can be quite different from other clusters. For example, one cluster may be quite targeted with little variation in its distribution of values while another cluster might have a larger distribution. Neighboring clusters might even have data points that overlap. This anomaly is accounted for in the step of classifying where probability statistics are used.

Classification

Once the clusters have been created and evaluated (i.e., identified as to land cover type), the classification process can be implemented. Each pixel is analyzed (independently) as to its probability of belonging to a given cluster class (based on a defined decision rule). Each pixel is then officially assigned (or classified) to the class to which it had the highest probability of belonging. The different decision rules include maximum likelihood, minimum distance, and Mahalanobis. Each utilizes slightly different parametric rules during the classification procedure. Typically, the decision algorithms utilize the mean, standard deviation, and covariance matrix of each cluster to compute the probability of association.

The output from a classification is a two-dimensional array of numbers in which each pixel is given the value of the cluster class that it most closely matched. As well, most classification software output a mathematical distance layer, which indicates the spectral distance the pixels was from the cluster centroid. This distance layer can be utilized to evaluate which pixels were more closely associated with a given cluster and, conversely, which pixels had a higher potential of being misclassified. A variation on this distance layer evaluation is that of a fuzzy classifier. With this classification option a multi-layer classification map is produced that has the following structure.

Layer 1—Each pixel is assigned the cluster number to which it had the highest probability of belonging.

Layer 2—Each pixel is assigned the cluster number to which it had the second highest probability of belonging.

Layer N—Each pixel is assigned the cluster number to which it had the $N^{th}$ highest probability of belonging.

Using this multi-layer classification and the classification distance layer, a fuzzy filter is processed over the data. The decision rule (user defined) basically looks at each pixel in conjunction with those pixels directly around it to determine if the correct decision was made by the classifier. For instance, if a pixel in an image was categorized (classified) as soybean while all of the pixels around it were classified as pine forest, one would begin to question the validity of the classification. With this in mind, the fuzzy filter will look to Layer 2 of the classification to see if the next highest class the pixel belonged to was pine forest. If there was a moderate chance of the pixel belonging to pine forest and all of the pixels around it were categorized as pine forest, the fuzzy filter will change the pixel to a pine forest pixel. If however, there was a very low probability of the pixel belonging to pine forest, the algorithm will leave it classified as soybean.

Crop Response Zone Generation

Concept of a Crop Response Zone

Figure 16:
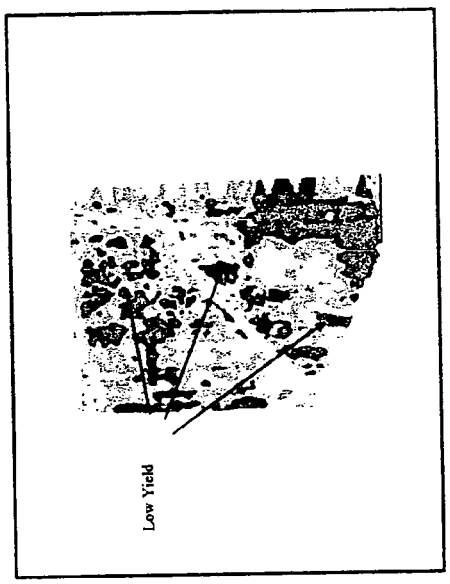
FIG. 16 is a yield map.

Over the past several years, growers throughout the country have begun to use yield monitors equipped with GPS systems to produce fairly detailed yield maps of their fields (FIG. 16). Although initially, these yield maps produced a great deal of interest and enthusiasm, over time, the growers began to question what in fact was the cause of the variation in yield that they were observing and what (if anything) should they do about it. After intense analysis of various yield maps from around the country, it became apparent that all poor yielding areas were not "poor yielding" for the same reason. In fact, many poor yielding areas may reach the "poor yield" status through totally different mechanisms. It therefore, became one goal of the inventors to attempt to understand, categorize, and eventually explain, why certain portions of an agricultural field do not reach its yield potential.

One method used by the inventors was that of analyzing and processing multiple dates of digital aerial imagery. By looking at vegetation (through the eyes of digital remote sensing systems) it was thought that some refinement of the yield map might be possible (i.e., poor yielding areas could be segmented into different vegetative growth progressions). In fact, this proved to be the case. Areas with late germination due to a wet spring and, topographically high, well drained areas, subjected to late season drought, both produced a poor yield. However, each reached poor yield through a totally different path. Acting on this concept, it was believed that remote sensing was one of the only reliable mechanisms for monitoring within field vegetative change over time.

Based on the above logic, it is obvious that the mapping of crop response zones requires the processing of multiple dates of remotely sensed imagery acquired during a given growing season. One thing to note is that the term growing season as defined earlier is considered from the end of harvest through the next harvest. However, based on crop rotation patterns throughout the midwest the collection of data over a given field could be every year, every other year, or every third year. Furthermore data from different crops during different growing seasons may be combined for analysis.

The following section will give a detailed account of the steps involved in crop response zone generation including dates of image acquisition, reformatting of digital data, band-to-band registration, vignetting correction, geocorrection of aerial imagery, layer stacking of all dates, image normalization, calculation of vegetative indices, cluster generation, and image classification. Many of these processes are quite in-depth and require substantial background knowledge in agriculture and image processing in order to fully understand and appreciate the concepts involved. To facilitate a reader gaining a full understanding of the invention by reading this disclosure, short discussions pertaining to remote sensing processes and concepts have been provided and presented above. This explanation of crop response zones will reference these short discussions as certain concepts are discussed in connection with the example discussed below.

Aerial Imagery

Aerial imagery was collected four times throughout the growing season. The image dates correlated with bare soil, V12, VT, and R4 crop stages (see section on "Resolutions in Remote Sensing"). The aerial imagery was flown with digital cameras with an array size of approximately 1500 pixels wide and 1000 pixels in the along track dimension. The digital systems were 8-bit systems and were collected and stored on an on-board computer in a Tagged Image Format (TIF). Four bands were collected representing the blue, green, red, and near infrared portions of the electromagnetic spectrum (see section on "Spectral Nature of Remote Sensing"). The cameras were aligned in a two-by-two matrix and were rigid mounted (pseudo-bore sited) with the lenses focussed on infinity. The imagery was flown at approximately 5000 feet above ground level (AGL) to produce a spatial resolution of approximately one meter by one meter (see section on "Resolutions in Remote Sensing"). The digital cameras have square pixels and are not interlaced during image acquisition. The optimum time for image acquisition was two hours before or two hours after solar noon (see section on "Resolutions in Remote Sensing"). Images were not acquired during times of poor atmospheric conditions (haze, rain, clouds). No cloud shadows were acceptable in the imagery.

Vignetting Correction and Band-to-Band Registration

Once the plane landed the images were extracted from the on-board computer and processed for vignetting. Positive Systems (the vendor that built the aerial imaging system called the ADAR 5000) produces a vignetting equation (empirically) for each of their cameras (see section on "Image Preprocessing"). Each data file was processed through a semi-automated band-to-band registration program. This program ensures a root mean square error of less than one pixel (see section on "Image Preprocessing"). The data were ultimately converted into an ERDAS format for storage on CD. These processes are all well known in the prior art.

Reformatting

The data were received by the inventors on CD in ERDAS *.lan format. The data were reformatted (changed to a more software compatible format) using ERDAS Imagine 8.31. The resulting format was an Imagine *.img file with a statistics file that ignored zero and corresponding pyramid layers for fast processing and rapid image display.

Geocorrection

The data were referenced to GPS collected field boundaries (which used an Ashtek survey grade GPS) (see section on "Image Preprocessing"). The geocorrection process utilized a minimum of 7 points per image with a root mean square error of less than one meter. A nearest neighbor resampling algorithm was used along with a $1^{st}$ order mathematical transformation. Rubber sheeting was used only in areas where there was significant local relief within a field (i.e., Council Bluffs). All images were rectified to the Universal Transverse Mercator Projection (using the appropriate longitudinal zone) with a NAD83 Datum (virtually no difference from WGS84).

The inventors have referenced each successive image to the first image taken, as opposed to referencing each image to a reference map or the like. However, this is considered to be a matter of choice and not critical to the successful operation of the invention.

Normalization

Figure 17:
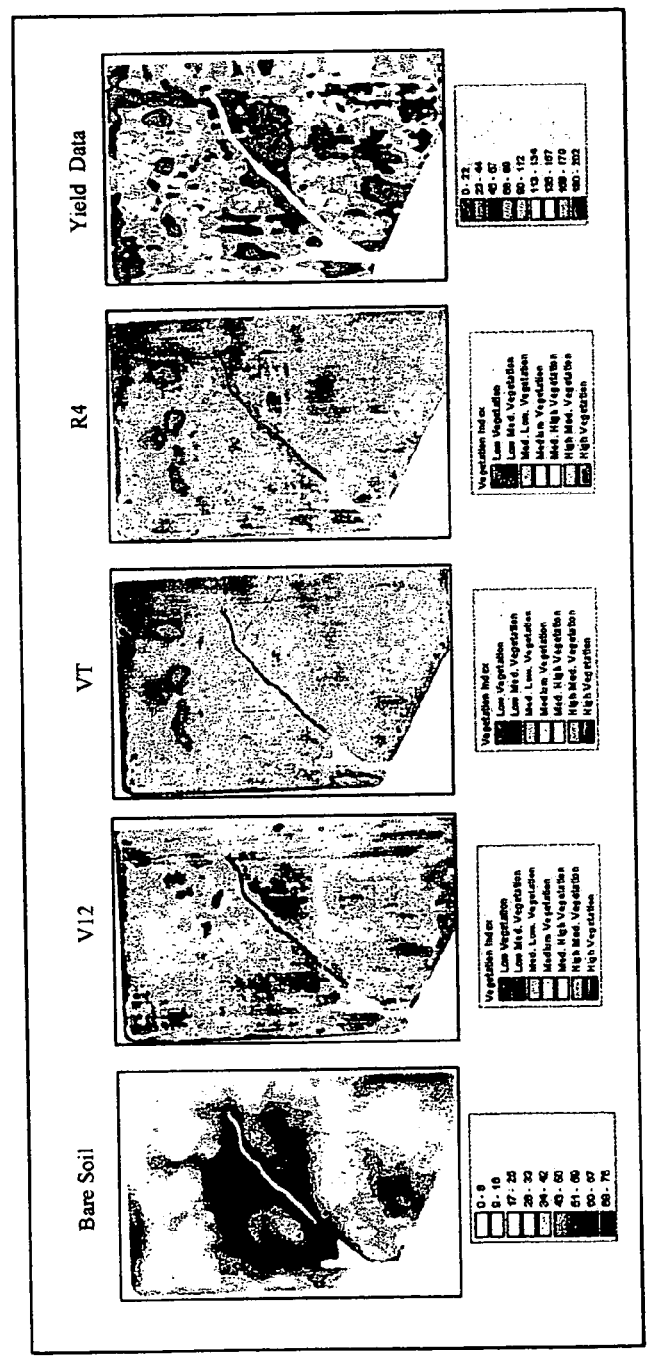
FIG. 17 is a set of processed aerial images taken through a growing season, including a reference bare soil image.
Figure 18:
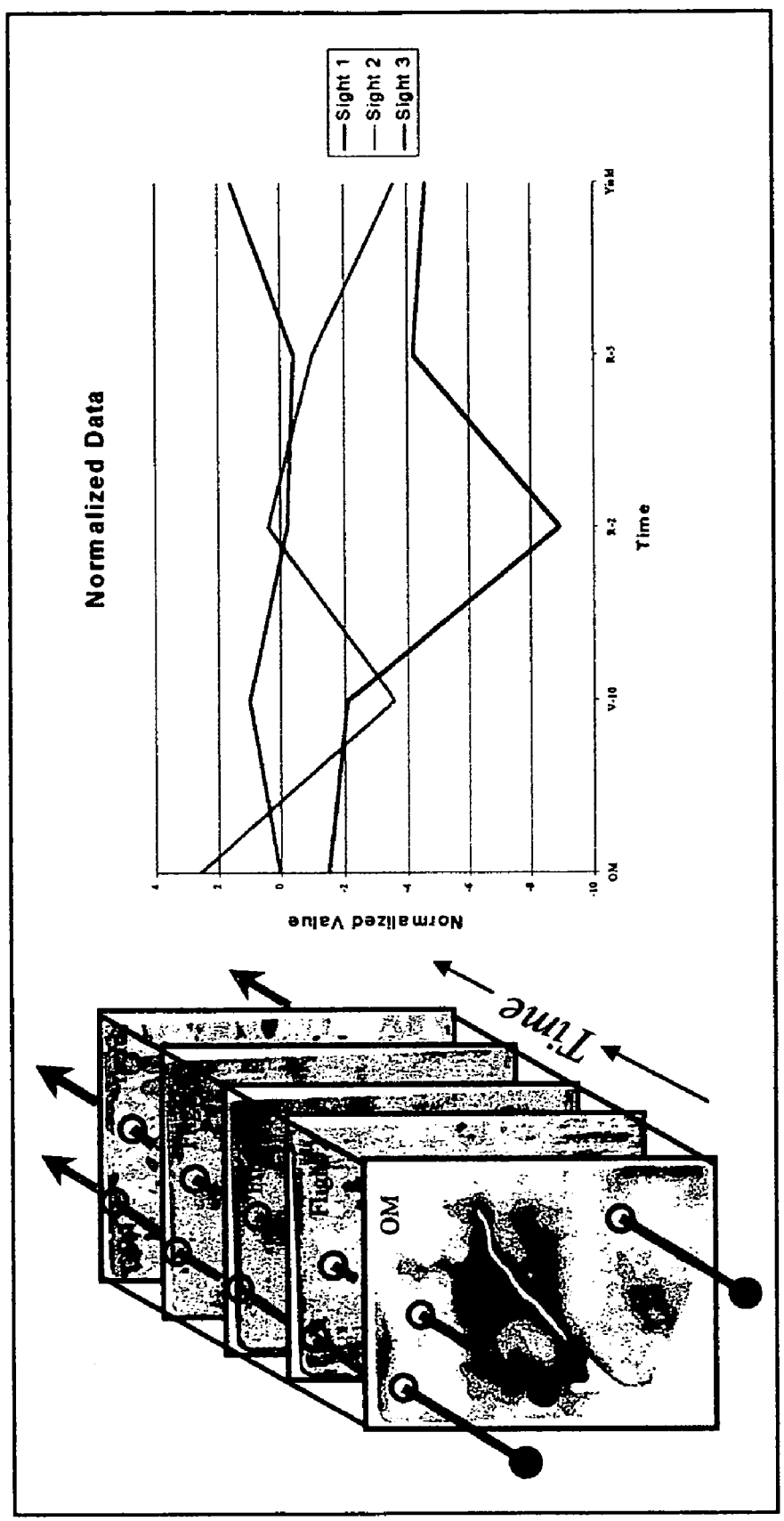
FIG. 18 is a graphical depiction of a normalized layer stacked image and its corresponding time progression.
Figure 22:
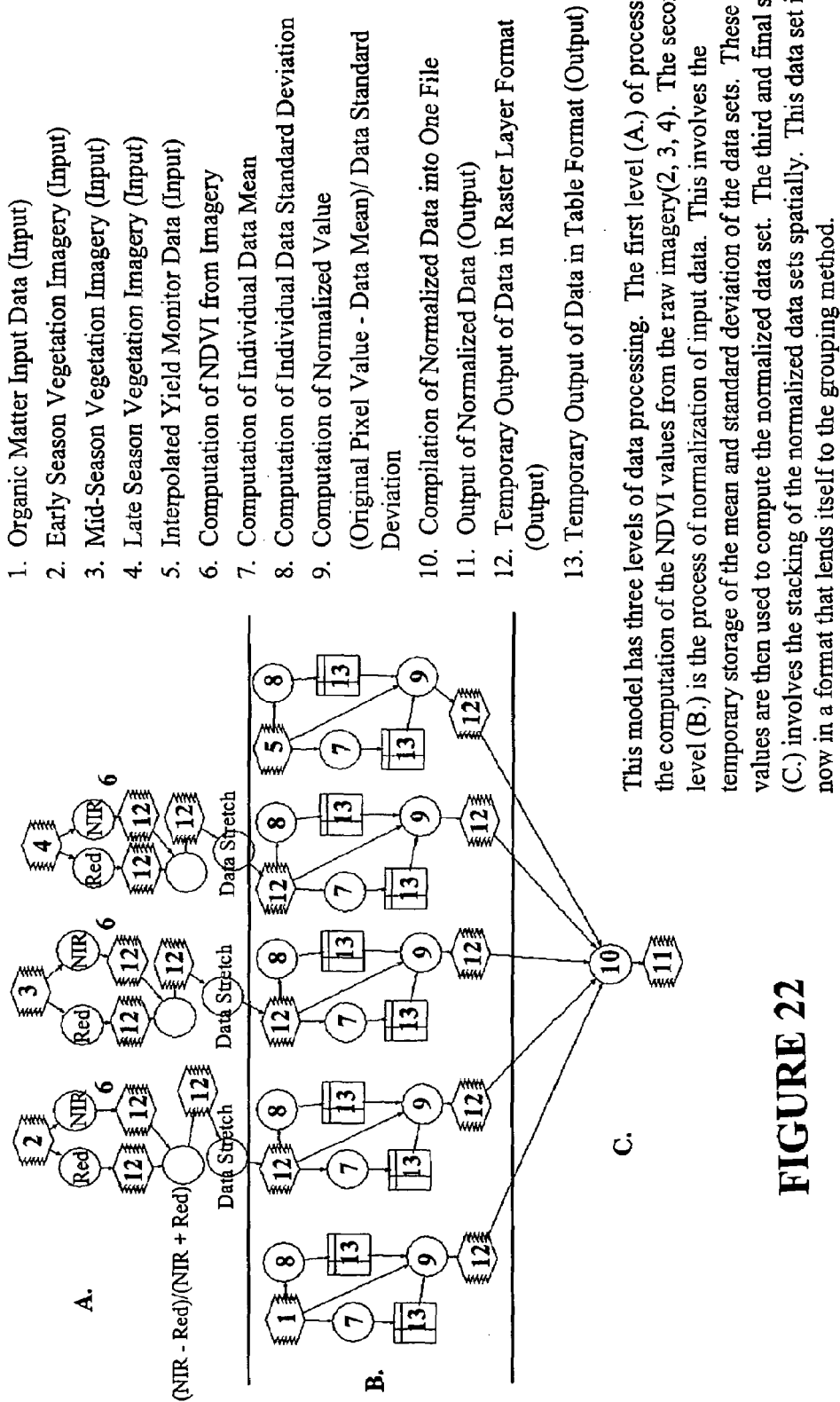
FIG. 22 is a graphical depiction of the normalization model.

Once rectified to a map base, the multi-date images were processed through a computer model in accordance with a computer program as disclosed in the attached Exhibit A to normalize the data. Normalization helps account for sensor variation, changes in growing season, changes in sun angle between acquisitions, and changes in atmospheric condition during image acquisition (see section on "Image Normalization). Basically, normalization enables temporal comparisons in the data. The normalization model included (at the beginning of the model) the computation of an NDVI for each image (see the section on "Vegetative Indices"). The resulting NDVI images were then normalized by the model. For the bare soil image, the red band was used, however, it was also normalized during the model execution mentioned above. As well, the model produced a normalized image of the yield monitor data. Additionally, the model constructed a new five band data file (termed layer stacking) with the following data layers (FIG. 17 and FIG. 18):

Band 1—normalized red band of bare soil image
Band 2—normalized NDVI of the V12 flight
Band 3—normalized NDVI of the VT flight
Band 4—normalized NVI of the R4 flight
Band 5—normalized yield monitor image As shown in FIG. 22, this model has three levels of data processing. The first level (A.) of processing is the computation of the NDVI values from the raw imagery(2, 3, 4). The second level (B.) is the process of normalization of input data. This involves the temporary storage of the mean and standard deviation of the data sets. These values are then used to compute the normalized data set. The third and final step (C.) involves the stacking of the normalized data sets spatially. This data set is now in a format that lends itself to the grouping method.

Clustering and Classification

The five band data file was then processed through an ISODATA clustering algorithm (see section on "Clustering and Classification"). The parameters for ISODATA were as follows:

Set initial cluster axis as a principal axis and automatic boundary segmentation (similar to first principal component)

Number of clusters was set to eight (optimum amount based on in-house study)

Convergence was set to 95%

Number of iterations was set to 10

All pixels were used (i.e., increment for both x and y were set to 1)

Figure 19:
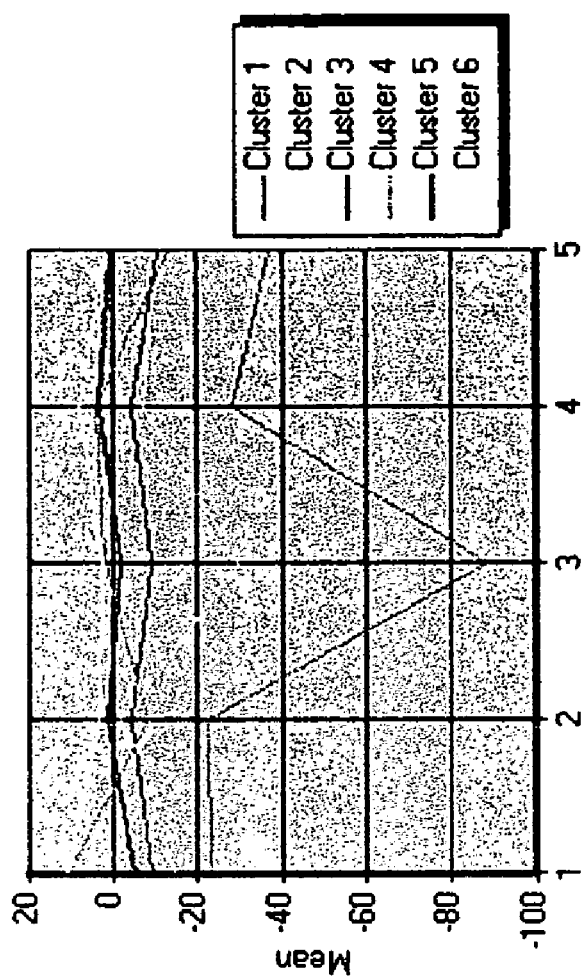
FIG. 19 is a graphical depiction of a cluster map and its corresponding spectral curves.
Figure 19:
Figure 20:
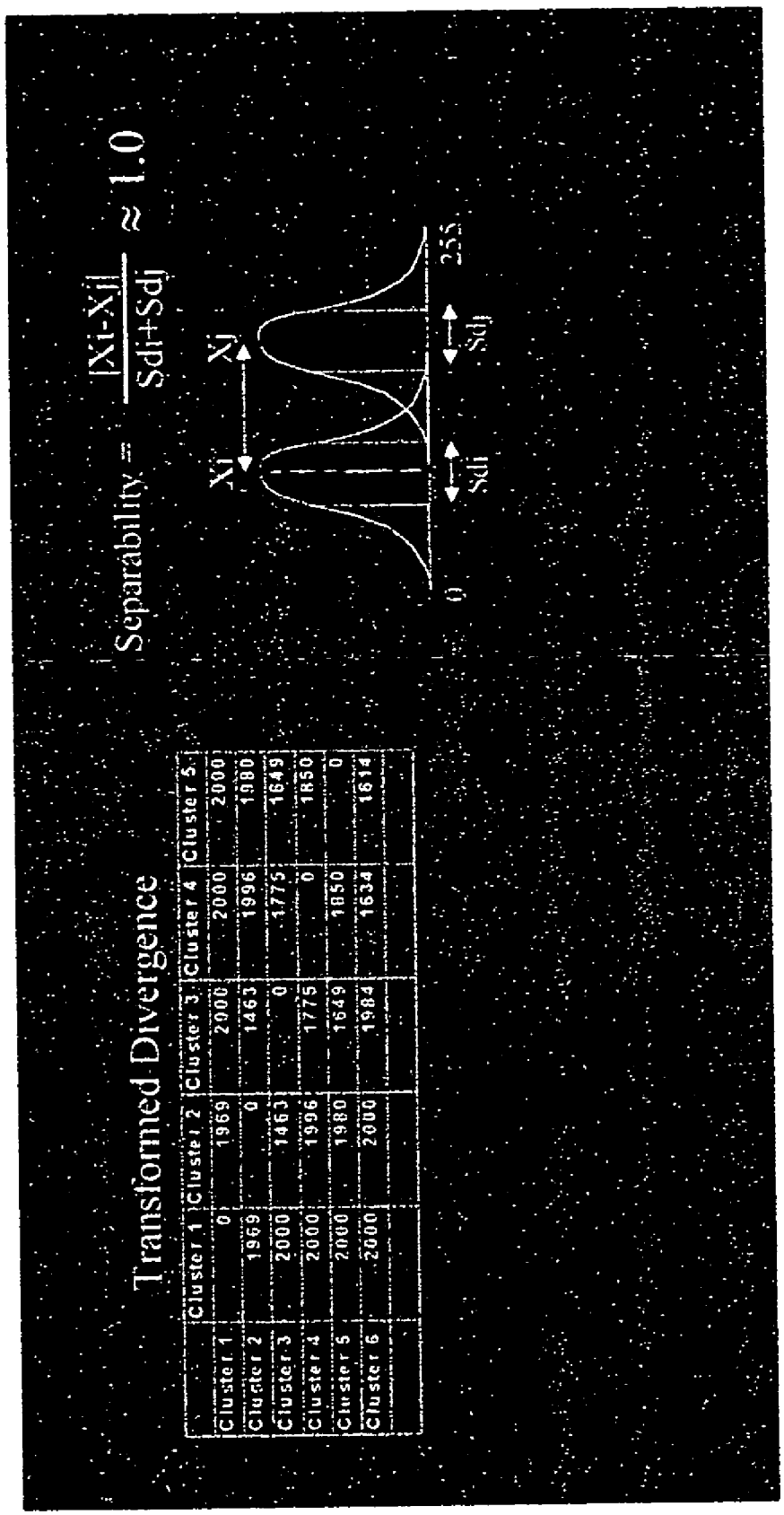
FIG. 20 is a table and corresponding graph illustrating the concepts of divergence 90 and separability.

An output image was created using the green, red, and near infrared statistics to drive the blue, green, and red color guns, respectively The resulting clusters were analyzed both spectrally (looking at spectral curves) and spatially (using the cluster map produced by the software) (FIG. 20). By looking at both the spectral and spatial information (along with information on spectral separability→Transformed Divergence→see Erdas Imagine Field Guide), the clusters were grouped into zones of similar vegetative progression over time. The generic formula for separability along with an actual table of Transformed Divergence is shown in FIGS. 19 & 20.

Crop Response Zone Classification

Once the clusters were analyzed and labeled, the raw normalized data were processed through a maximum likelihood classifier (see section on "Clustering and Classification"). Unlike the clustering algorithm that simply uses a "minimum distance to the mean" computation, the maximum likelihood algorithm employs the use of the cluster mean and the standard deviation to determine the probability of correct categorization. Although at times there is little difference, major differences have been noted depending on the data. The following are the parameters set during the classification process.

Figure 21:
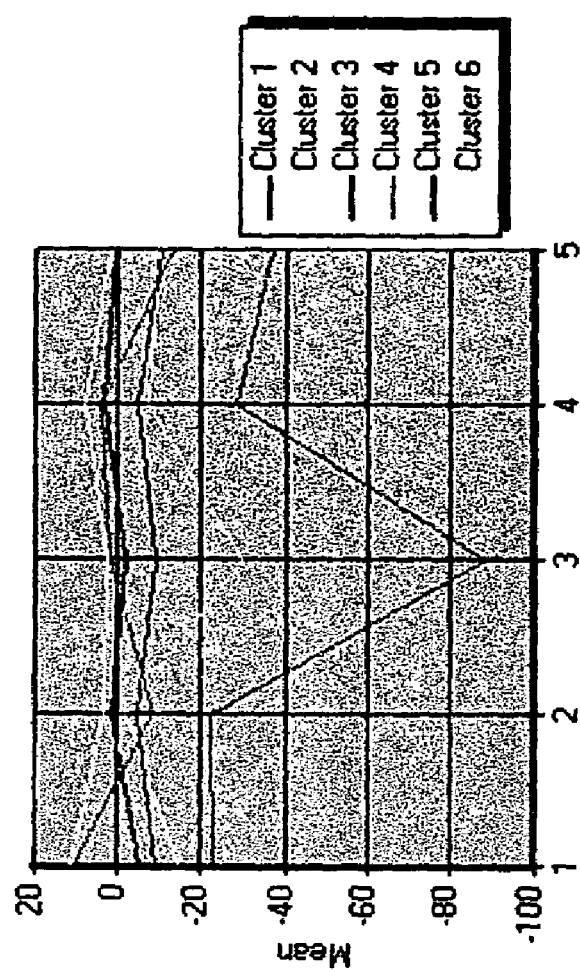
FIG. 21 is an image of the final crop response zone map and corresponding spectral curves.
Figure 21:

The non-overlap rule was set to non-parametric
The overlap rule was set to parametric
The parametric rule was set to maximum likelihood
All chi-square values were set equal to each other for the a priori probability
No threshholding was used during the classification process Crop Response Zone Curve Evaluation By evaluating the spectral curves generated during the clustering process, one can begin to understand a bit about the crop response zone environment, and the story that is told for the crop during the growing season. FIG. 21 shows both the classification map and the corresponding spectral curves. A quick analysis reveals some interesting trends. The following is a brief analysis of three zones.

Cluster #1 (red)—This area has below average organic matter (band 1), has poor vegetation on flight 2, very poor vegetation on flight 3, poor vegetation on flight 4, and ends up having the lowest overall yield for the field.

Cluster #4 (purple)—This cluster has above average organic matter, lower than average vegetation on flight 2, above average vegetation on flights 3 and 4, and still ends up with a below average yield. This is an area of the field that is susceptible to too much early season moisture. Even though the vegetation looks good on flight 3 and 4, the yield loss was already established by flight #2.

Cluster #6 (white)—This cluster (or crop response zone) has above average organic matter and excellent vegetative health throughout the growing season. Its final yield is among the best in the field.

The grower can use this kind of information as feedback for use in his making the relatively few decisions available to him to increase his yield. Heretofore, raw yield data was not very useful, for the reasons given. However, this data now becomes useful, even powerful, for helping the grower decide on strategies for different locations in his field. And, with the increasing sophistication of farm equipment and their GPS capability, the grower has the ability to tailor his farming activities for these various crop response zones located at different areas in his field. Thus, the present invention actually increases the usability of the more sophisticated farming equipment, and makes it more cost effective so that its increased expense can be justified through increased yields. The invention also provides a value added for a seed supplier in that upon doing a crop response zone analysis of a grower's field, the seed which provides the best yield for each crop response zone can be separately identified for the grower while other seed suppliers not having access to the crop response zone information would not know how to specify seed variety, quantity, etc with the same kind of precision.

While the principal advantages and features have been exemplified in the context of the preferred embodiment, one of ordinary skill in the art would recognize that the invention is not so limited. There are various changes and modifications that would be obvious to one of ordinary skill in the art while keeping within the scope of the invention. For example, various specific mathematical techniques have been used for various steps in the methods disclosed herein. Other mathematical techniques could also be implemented and which would not represent a departure from the invention. The preferred embodiment utilizes a particular vegetative index in its preferred embodiment, but other vegetative indices could be used as well. Certain statistical parameters have been utilized in certain of the steps, but other parameters could possibly be used as well. Still other changes could be visualized by those of ordinary skill in the art, but the invention should be considered as being limited only by the scope of the claims and their equivalents.

What is claimed is:

1. A method for processing multiple initial data sets of unclassified pixel values to enable their comparison on a relative basis, each of said data sets being representative of the vegetative growth in a field, said method comprising the steps of:
converting each unclassified pixel value of each initial data set to a normalized value, thereby creating a new data set of unclassified normalized pixel values corresponding to each initial data set of unclassified pixel values, and
using the data sets of unclassified normalized pixel values as representative of the initial data sets for comparison purposes.

2. The method of claim 1 wherein the converting step comprises the steps of:
for each initial data set of unclassified pixel values, calculating a set of statistical parameters associated therewith, wherein the calculated statistical parameters reflect only the statistical parameters for that initial data set, and
using said calculated statistical parameters in converting only the unclassified pixel values of its associated initial data set.

3. The method of claim 2 wherein the step of calculating comprises the step of calculating the mean and the standard deviation for each initial data set.

4. The method of claim 3 wherein the step of using said calculated statistical parameters comprises the steps of subtracting the pixel value from the mean and dividing the result by the standard deviation.

5. The method of claim 4 wherein each pixel value corresponds to an NDVI value, and further comprising the step of calculating an NDVI value for each original reading taken from the field.

6. The method of claim 5 wherein the original readings are expressed in terms of a binary number and the step of calculating an NDVI value includes the step of converting said binary numbers into a decimal number.

7. A method for scaling multiple data sets of pixel values to enable their comparison on a relative basis, each of said data sets being representative of the vegetative growth in a field, each data set comprising unclassified pixel values, said method comprising the steps of:
statistically normalizing each data set of unclassified pixel values based on its own mean and standard deviation, and
using the data sets of normalized values as representative of the data sets of pixel values for comparison purposes.

8. The method of claim 7 further comprising the step of calculating the pixel values by converting raw data into a vegetative index value for each pixel.

9. The method of claim 8 wherein the step of statistically normalizing includes the steps of subtracting the pixel value from the mean for each data set and dividing the result by the standard deviation of each data set to thereby calculate a set of values representative of the pixel values for comparison purposes.

10. A method for characterizing different areas of a field used for growing vegetation according to the presence of vegetation in said areas over a growing season, said method comprising the steps of:
periodically collecting a set of data characterizing the amount of vegetation present in the field, thereby producing a plurality of data sets,
normalizing the data in each data set,
aggregating the normalized data comprising said normalized data sets, and
grouping said normalized data into a plurality of groups based on their respective normalized values, said plurality of groups being representative of said different field areas.

11. The method of claim 10 wherein the step of periodically collecting a set of data includes the step of collecting a set of data that spatially characterizes the presence of vegetation in the field.

12. The method of claim 11 further comprising the step of registering the data sets so that the data in each data set are substantially correlated with the data in other data sets.

13. The method of claim 12 wherein each data set includes a plurality of pixels, each pixel corresponding to a geographic location in said field, and wherein the step of registering the data includes the step of substantially aligning pixels from data sets corresponding to the same geographic location in said field.

14. The method of claim 12 wherein the step of aggregating the normalized data comprises the step of plotting each normalized data set along an axis to thereby create a multi-dimensional array of said normalized data.

15. The method of claim 12 wherein the step of grouping the normalized data comprises the step of assigning each data point into a cluster based on its Euclidean distance from a calculated mean of each cluster.

16. The method of claim 15 further comprising the step of classifying the normalized data in said array by assigning each data point into a cluster based on its mathematical probability of belonging to said cluster.

17. A method for defining a plurality of crop response zones in a field used for growing vegetation, each of said crop response zones being characterized by having similar temporal growth characteristics, the method comprising the steps of:

periodically collecting data characterizing the vegetative growth in the field, thereby creating a plurality of temporally separated data sets, normalizing the data of each data set independently of the other data sets, and grouping the normalized data into clusters, each of said groups being representative of a crop response zone.

18. The method of claim 17 wherein the step of periodically collecting the data includes the step of collecting data that is specific to a particular geographic location in the field.

19. The method of claim 18 further comprising the step of converting the data into corresponding values of a vegetative index.

20. The method of claim 19 further comprising the step of registering the data.

21. The method of claim 20 wherein the step of grouping further comprises the step of classifying the data into clusters based on their statistical probability for belonging to a particular cluster.

22. A pre-programmed digital electronic device for defining a plurality of crop response zones in a field used for growing vegetation, each of said crop response zones being characterized by having similar temporal vegetative growth characteristics, comprising:

means for processing a plurality of data sets taken periodically which characterize the vegetative growth in the field, means for normalizing the data of each data set independently of the other data sets, and means for clustering the normalized data into clusters, each of said clusters being representative of a crop response zone.

23. The device of claim 22 further comprising means for converting the data into corresponding values of a vegetative index.

24. The device of claim 23 further comprising means for registering the data taken at different times.

25. The device of claim 24 further comprising means for classifying the data into clusters based on their statistical probability for belonging to a particular cluster.

26. The device of claim 25 further comprising means for displaying the data arranged in clusters.

27. A pre-programmed digital electronic device for processing multiple initial data sets of unclassified pixel values to enable their comparison on a relative basis, each of said data sets being representative of the vegetative growth in a field, comprising:

means for converting each unclassified pixel value of each initial data set to a normalized value based on statistical parameters that are derived solely from the unclassified pixel values of the initial data set to which the unclassified pixel value belongs, thereby creating a new data set of normalized values corresponding to each initial data set, and means for comparing said data sets of normalized values as representative of the initial data sets.

28. The device of claim 27 wherein said initial data sets each represent a reading taken from the field at different times and under different conditions, and wherein said converting means includes means for registering said initial data sets geographically across the field.

29. A method for defining areas in a field which perform substantially alike in growing vegetation over the course of at least a portion of a growing season, said method comprising the steps of:

generating a plurality of data sets by periodically measuring the vegetative growth across said field, said measurements being associated with a geographic location in said field, each data set comprising a plurality of pixel values and corresponding to a different measurement, converting said pixel values of each data set into vegetative index values, normalizing said each converted pixel value of each data set based on statistical parameters that are derived solely from the converted pixel values of the data set to which that converted pixel value belongs, arranging said normalized pixel values from each data set along an axis of a multi-dimensional coordinate system, defining, at least partially on the basis of the arranged normalized pixel values, a plurality of field areas in the coordinate system that substantially share the same performance, and labeling the characteristics of said field areas according to their shared performance.

30. The method of claim 29 wherein the step of periodically measuring includes the step of measuring the reflected electromagnetic energy from the field.

31. The method of claim 30 wherein the step of defining the plurality of field areas includes the step of aggregating a plurality of the normalized pixel values into each of said defined field areas based on their statistical probability of belonging to said defined field area.

32. A method for processing multiple data sets of unclassified pixel values to enable their comparison on a relative basis, at least one of said data sets being representative of the agronomic variability in a field, said method comprising the steps of:

converting each unclassified pixel value of at least one of said data sets to a normalized value, wherein the normalization of each pixel value is based on statistical parameters derived from the unclassified pixel values of only the at least one data set to which that unclassified pixel value belongs, thereby creating a new data set of normalized values corresponding to said at least one of said data sets of pixel values, and using the data set of normalized values as representative of the data sets of pixel values for comparison purposes.

33. The method of claim 32 wherein the step of converting includes the step of converting the unclassified pixel values of each data set desired to be compared.

34. The method of claim 32 further comprising the step of using at least one data set comprised of remotely sensed data.

35. The method of claim 32 wherein the converting step comprises the steps of calculating a set of statistical parameters for each data set of unclassified pixel values, and using said calculated statistical parameters in converting only its associated data set of pixel values.

36. The method of claim 35 wherein the step of calculating comprises the step of calculating the mean and the standard deviation for each data set of unclassified pixel values desired to be compared.

37. The method of claim 36 wherein each pixel value corresponds to a vegetative index value, and further comprising the step of calculating a vegetative index value for each reading taken from the field.

38. A digital electronic storage medium, said digital electronic storage medium containing a stored digital program for performing the steps of the method recited in claim 32.

39. The digital electronic storage medium of claim 38 wherein said digital electronic medium comprises a computer disk.

40. An electronic digital processing machine, said machine being connected to a network of computers, said machine containing a stored digital program for performing the steps of the method recited in claim 32.

41. A method of scaling multiple data sets of unclassified pixel values to enable their comparison on a relative basis, at least one of said data sets being representative of the agronomic variability in a field, said method comprising the steps of:
   statistically normalizing said at least one data set based on its own mean and standard deviation, and
   using said at least one data set of normalized values as representative of said at least one data set of pixel values for comparison purposes.

42. The method of claim 41 further comprising the step of calculating the pixel values by converting raw data into a vegetative index value for each pixel.

43. A digital electronic storage medium, said digital electronic storage medium containing a stored digital program for performing the steps of the method recited in claim 41.

44. The digital electronic storage medium of claim 43 wherein said digital electronic medium comprises a computer disk.

45. An electronic digital processing machine, said machine being connected to a network of computers, said machine containing a stored digital program for performing the steps of the method recited in claim 41.

46. A method for characterizing different areas of a field used for growing vegetation according to the presence of vegetation in said areas over time, said method comprising the steps of:
   periodically collecting a set of data characterizing the presence of vegetation in the field, thereby producing a plurality of data sets,
   for each data set, normalizing the data therein on the basis of statistical parameters derived solely from the data of that data set,
   aggregating the normalized data comprising said normalized data sets, and
   grouping said normalized data into a plurality of groups based on their respective normalized values, said plurality of groups being representative of said different field areas.

47. The method of claim 46 wherein the step of normalizing comprises normalizing the data in each set according to statistical parameters derived solely from the data in the data set to which the data being normalized belongs.

48. The method of claim 47 wherein the step of periodically collecting the data includes spatially associating said data with the field areas.

49. The method of claim 48 wherein the step of periodically collecting the data includes the step of collecting data which characterizes the health and amount of vegetation in the field areas.

50. The method of claim 49 wherein the step of periodically collecting data includes collecting data no less frequently than once for each growing season desired to be characterized.

51. The method of claim 49 wherein the step of periodically collecting data includes collecting data no less frequently than at least four times during a growing season, for characterizing said field areas during said growing season.

52. The method of claim 49 further comprising the step of registering the data sets so that the data in each data set are substantially correlated with the data in other data sets.

53. The method of claim 52 wherein each data set includes a plurality of pixels, each pixel corresponding to a geographic location in said field, and wherein the step of registering the data includes the step of substantially aligning pixels from data sets corresponding to the same geographic location in said field.

54. The method of claim 49 further comprising the step of clustering said normalized data into a plurality of clusters based on their respective normalized values.

55. The method of claim 54 wherein the step of clustering the normalized data comprises the step of assigning each data point into a cluster based on its Euclidean distance from a calculated mean of each cluster.

56. The method of claim 55 further comprising the step of classifying the normalized data by assigning each data point into a cluster based on its mathematical probability of belonging to said cluster.

57. A method for defining a plurality of crop response zones in a field used for growing vegetation, each of said crop response zones being characterized by having similar temporal vegetative growth characteristics, the method comprising the steps of:
   periodically collecting data characterizing the vegetative growth in the field, thereby generating a plurality of vegetative growth data sets, each vegetative growth data set corresponding to a different collection,
   normalizing the data in each vegetative growth data set independently of the data in the other vegetative growth data sets, and
   grouping the normalized data into groups, each of said groups being representative of a crop response zone.

58. The method of claim 57 wherein the step of periodically collecting the data includes the step of collecting a plurality of temporally separated data sets that are specific to a particular geographic location in the field, wherein the step of normalizing comprises normalizing the data in each data set according to statistical parameters derived solely from the data in the data set to which the data being normalized belongs, and further comprising the step of geographically registering the data.

59. The method of claim 58 wherein the step of collecting the data includes the step of collecting remotely sensed data, and further comprising the step of converting the remotely sensed data into corresponding values of a vegetative index.

60. The method of claim 59 wherein the step of grouping further comprises the step of clustering the data into clusters based on their statistical probability of belonging to a particular cluster.

61. A digital electronic storage medium, said digital electronic storage medium containing a stored digital program for performing the steps of the method recited in claim 57.

62. The digital electronic storage medium of claim 61 wherein said digital electronic medium comprises a computer disk.

63. An electronic digital processing machine, said machine being connected to a network of computers, said machine containing a stored digital program for performing the steps of the method recited in claim 57.

64. A method for defining areas in a field which perform substantially alike in growing vegetation over the course of time, said method comprising the steps of:

generating a plurality of data sets by periodically measuring the health and amount of vegetation throughout said field, said measurements being associated with specific geographic locations in said field, each data set corresponding to a different measurement, converting said data in said data sets into vegetative index values, normalizing said converted data of each data set independently of the data of the other data sets, defining a plurality of field areas that substantially share the same performance throughout the data on the basis of the normalized data, and identifying the characteristics of said field areas according to their shared performance.

65. The method of claim 64 wherein the step of measuring data includes the step of periodically remotely sensing data, thereby creating a plurality of temporally separated data sets comprising data values indicative of the health and amount of vegetation in specific geographic locations in said field, and wherein the step of normalizing comprises normalizing the converted data in each data set according to statistical parameters derived solely from the converted data in the data set to which the converted data being normalized belongs.

66. The method of claim 65 wherein the defining step includes aggregating a plurality of the data into each of said defined field areas based on their statistically probability of belonging to said defined field area.

67. A digital electronic storage medium, said digital electronic storage medium containing a stored digital program for performing the steps of the method recited in claim 64.

68. The digital electronic storage medium of claim 67 wherein said digital electronic medium comprises a computer disk.

69. An electronic digital processing machine, said machine being connected to a network of computers, said machine containing a stored digital program for performing the steps of the method recited in claim 64.

* * * * *